United States Patent [19]

Oshima et al.

[11] Patent Number: 5,192,814

[45] Date of Patent: Mar. 9, 1993

[54] REACTION INJECTION MOLDING POLYUREA RESIN COMPOSITION

[75] Inventors: Toshiyuki Oshima, Ibaraki; Hideo Ishibashi, Neyagawa; Rie Tamura, Toyonaka; Satoshi Yamamoto, Hirakata; Takaharu Izumo, Shimamoto, all of Japan

[73] Assignee: Nippon Paint Company, Ltd., Osaka, Japan

[21] Appl. No.: 875,764

[22] Filed: Apr. 29, 1992

[30] Foreign Application Priority Data

Apr. 30, 1991 [JP] Japan .................................. 3-128419

[51] Int. Cl.$^5$ .............................................. C08G 18/14
[52] U.S. Cl. ..................................... 521/163; 521/51; 521/159; 528/68
[58] Field of Search ........................ 521/163, 159, 51; 528/68

[56] References Cited

PUBLICATIONS

Grigsby et al., "Modified Polyetheramines in RIM", Journal of Elastomers and Plastics, vol. 23, pp. 54-65, Jan., 1991.

*Primary Examiner*—Maurice J. Welsh
*Attorney, Agent, or Firm*—Millen, White, Zelano and Branigan

[57] ABSTRACT

A polyurea resin molding composition for reaction injection molding use which comprises (a) a polyoxyalkylenepolyamine, (b) an aromatic polyamine and/or a xylylenediamine and (c) a polyisocyanate, wherein either one or both of components (a) and (b) have been modified by a Michael reaction with an unsaturated compound of the formula $CH_2=C(R)-Y$ wherein R is H or $CH_3$ and Y is an electron attracting group. The use of such modified polyamine(s) improves in-mold flow and green strength characteristics.

7 Claims, No Drawings

REACTION INJECTION MOLDING POLYUREA RESIN COMPOSITION

FIELD OF THE INVENTION

This invention relates to a polyurea resin composition for reaction injection molding (hereinafter referred to briefly as RIM) use.

BACKGROUND OF THE INVENTION

Recent years have witnessed a mounting interest in the RIM technology, that is a technology by which an automotive bumper, for instance, is manufactured by simultaneous polyurethane-forming reaction and molding of the resulting resin in a metal mold, and several versions of such technology have been disclosed in, inter alia, U.S. Pat. Nos. 4,254,069, 3,838,076, 4,216,543, 4,246,363 and 4,269,945.

However, the technology of reacting a polyalkylenepolyol with a polyisocyanate in a mold cavity to give a polyurethane molding in situ not only encountered various difficulties due to the relatively poor heat resistance and coatability of the polyurethane but entailed a high production cost. For this reason, attention was paid to polyurea resins which are more heat-resistant and there has been proposed a technology for producing polyurea moldings which are superior to polyurethane moldings in mechanical strength, heat resistance and other physical properties. This technique comprises reacting an amine-terminated-polyoxyalkylenepolyamine having an average molecular weight of at least 1500 with an amine terminal chain extender and a polyisocyanate in a closed mold. A method in this category is disclosed in Japanese Patent Application Laid-open No. 58-188643.

However, since a polyoxyalkylenepolyamine is more reactive to an isocyanate component than a polyether polyol, the cure reaction proceeds so fast that, unless mold charging is completed within, say, one second, the flow in the mold is adversely affected and no satisfactory molding can be obtained.

Therefore, given impetus from the fact that a secondary amine is generally less reactive to an isocyanate compound than a primary amine, Japanese Patent Application Laid-open No. 311116/1989 and No. 41310/1990 each proposed a RIM polyurea resin composition with improved flow characteristics, which is obtainable by converting the primary amino groups of the chain extender aromatic or aliphatic diamine at least partially to secondary amino groups by alkylation. However, the alkylating agent used for this purpose, such as an alkyl halide, is rather expensive and, inclusive of the addition and removal of an acid accepter substance for capturing the byproduct hydrogen halide, the synthesis of such a secondary amine compound is time-consuming and costly and the rate of conversion to the secondary amine is also low.

The object of the invention is to provide a RIM polyurea resin composition with improved in-mold flow and initial (green) strength characteristics using a secondary polyamine which can be easily synthesized with a readily available reagent at comparatively low cost.

SUMMARY OF THE INVENTION

This invention is, therefore, directed to a RIM polyurea composition comprising (a) a polyoxyalkylenepolyamine,
(b) an aromatic polyamine and/or a xylylenediamine, and
(c) a polyisocyanate compound.

The outstanding feature of this invention resides in the use of a modified polyamine or modified polyamines such that either the whole or part of at least one of said polyamine components (a) and (b) has been modified by a Michael reaction of the primary amino group with an unsaturated compound of the formula $CH_2=C(R)-Y$ (wherein R means hydrogen or methyl; Y means an electron attracting group with the proviso that R cannot represent methyl when the polyamine is an aromatic polyamine).

DETAILED DESCRIPTION OF THE PREFERRED EMBODIMENTS

Michael Reaction

In this invention, the above-mentioned modified polyamine or polyamines are used for either one or both of (a) polyoxyalkylenepolyamine and (b) chain extender aromatic polyamine and/or xylylenediamine in a RIM polyurea resin composition. Such modified polyamine can be easily synthesized at a relatively high conversion rate by subjecting the corresponding primary polyamine and a vinyl monomer of the formula $CH_2=C(R)-Y$ to Michael reaction using or without using a catalyst. The reaction mixture thus obtained can be directly put to use without purification. The use of such a modified polyoxyalkylenepolyamine and/or chain extender polyamine provides a RIM polyurea resin composition with markedly improved in-mold flow and green strength characteristics.

The modified polyamines mentioned above and the use thereof in a RIM polyurea resin composition are novel entities and a novel concept, respectively.

The polyoxyalkylenepolyamine having terminal primary amino groups for use as a starting compound in this invention can be provided, for example by the process comprising reacting a polyoxyalkylenepolyol having at least two terminal hydroxyl groups with ammonia with the aid of a hydrogenation-dehydrogenation catalyst at elevated temperature and pressure (e.g. Belgian Patent 677124).

The polyoxyalkylenepolyol mentioned above can be obtained by subjecting an alkylene oxide to ring-opening polymerization using a basic catalyst, such as an alkali metal hydroxide, in the presence of an appropriate initiator. The starting compound includes, inter alia, ethylene glycol, diethylene glycol, triethylene glycol and other polyethylene glycols, propylene glycol, dipropylene glycol, tripropylene glycol and other polypropylene glycols, glycerol, diglycerol, pentaerythritol, sorbitol, sucrose and other polyhydric alcohols, bisphenol A, bisphenol S, resol and other polyphenols, and various amines such as diethanolamine, triethanolamine and so on. As regards the alkylene oxide mentioned above, ethylene oxide, propylene oxide, butylene oxide, tetrahydrofuran, etc. can be used independently or in an optional combination. The average molecular weight range of polyoxyalkylenepolyol is 200 to 10,000 and preferably 400 to 8,000.

Many polyoxyalkylenepolyamines are commercially available. For example, Jeffamine D-2000 (Texaco Chemical, amine equivalent ca. 1000) is a polyoxypropylenediamine and Texrim TR-5050 (ditto, amine equivalent ca. 1930) and Jeffamine T-403 (ditto, amine equivalent ca. 160) are polyoxypropylenetriamines. All of such commercial polyoxyalkylenepolyamines can be used with advantage in this invention.

The primary aromatic diamine for use as a starting compound in accordance with this invention includes, inter alia, 2,4-diaminotoluene, 2,6-diaminotoluene, 1-methyl-3,5-diethyl-2,4-diaminobenzene, 1-methyl-3,5-diethyl-2,6-diaminobenzene (the latter two are also known as diethyltoluenediamine or DETDA), 1,3,5-triethyl-2,6-diaminobenzene, 4,4'-diaminodiphenylmethane, 3,5,3',5'-tetraethyl-4,4'-diaminodiphenylmethane, 3,5-diethylthio-2,4-toluenediamine and so on. The preferred aromatic polyamines are 2,4-diaminotoluene, 2,6-diaminotoluene, 1-methyl-3,5-diethyl-2,6-diaminobenzene, 1-methyl-3,5-diethyl-2,4-diaminobenzene and 4,4'-diaminodiphenylmethane, inclusive of mixtures of such polyamines.

Many such aromatic diamines are commercially available. Thus, for example, Etacure 100 (Asano Chemicals) is a mixture of 1-methyl-3,5-diethyl-2,4-diaminobenzene and 1-methyl-3,5-diethyl-2,6-diaminobenzene, Tolylenediamine (Mitsui Toatsu Chemicals) is 2,4-diaminotoluene and MDA-220 (Mitsui Toatsu Chemicals) is 4,4'-diaminodiphenylmethane.

While xylylenediamine may occur as 1,2- 1,3- and 1,4-isomers, any of these isomers and any mixture of them are within the scope of this invention.

The xylylenediamine for use in this invention can be prepared by hydrogenating the corresponding dinitrile in the presence of a nickel or cobalt catalyst. Such a xylylenediamine is commercially available under the tradename of Showamine X (Showa Denko).

The mating compound, namely an unsaturated compound of the formula $CH_2=C(R)-Y$ (wherein R means a hydrogen atom or a methyl group; Y means an electron attracting group such as a carboxylic acid residue, ketone residue, a cyano group, an unsubstituted or substituted amide residue, sulfone residue, sulfonic ester residue or the like), includes, inter alia, acrylic esters (e.g. n-butyl acrylate, i-butyl acrylate, t-butyl acrylate, 2-ethylhexyl acrylate, methyl acrylate, lauryl acrylate, stearyl acrylate, propyl acrylate, 2-hydroxyethyl acrylate, 2-hydroxypropyl acrylate, etc.), methacrylic esters (e.g. n-butyl methacrylate, i-butyl methacrylate, t-butyl methacrylate, 2-ethylhexyl methacrylate, methyl methacrylate, lauryl methacrylate, stearyl methacrylate, propyl methacrylate, 2-hydroxyethyl methacrylate, 2-hydroxypropyl methacrylate, etc.), acrylonitrile, acrylamide, N,N-dimethylacrylamide, methyl vinyl ketone, ethyl vinyl ketone, methyl vinyl sulfone, ethyl vinyl sulfone, methyl vinylsulfonate, ethyl vinylsulfonate and so on. All of these compounds can be advantageously used in this invention.

When an unsaturated compound of the formula $CH_2=C(R)-Y$ wherein R is a hydrogen atom is used in the Michael reaction with a polyoxyalkylenepolyamine, the reaction is preferably conducted in the presence of a low molecular weight aromatic compound having at least one electron donating or electron attracting group, other than hydrogen, as a substituent.

As examples of such aromatic compounds having at least one electron donating or electron attracting group, other than hydrogen, as a substituent on the aromatic ring, there may be mentioned hydrocarbon substituted compounds (toluene, xylene, ethylbenzene, t-butylbenzene, diphenylmethane, etc.), amino-substituted compounds (aniline, N,N-dimethylaniline, tolylenediamine, xylidine, diaminodiphenylmethane, diethyltolylenediamine, aminonaphthalene, etc.), alcohol-substituted compounds (phenol, cresol, naphthol, etc.), halogen-substituted compounds (fluorobenzene, chlorobenzene, bromobenzene, iodobenzene, fluoronaphthalene, chloronaphthalene, bromonaphthalene, iodonaphthalene, etc.), nitro-substituted compounds (nitrobenzene, dinitrotoluene, dinitronaphthalene, etc.), cyano-substituted compounds (benzonitrile, naphthonitrile, etc.), ketone-substituted compounds (acetophenone, propiophenone, etc.), quinones (benzoquinone, naphthoquinone, etc.), and compounds having two or more different such substituents in combination. These compounds are used where necessary and have been demonstrated to be effective in enhancing the yield of Michael reaction.

Such low molecular weight aromatic compound having at least one electron donating or electron attracting group, other than hydrogen, as a nuclear substituent is used with advantage in the modification reaction of a polyoxyalkylenepolyamine. It has been found that the addition of such a compound even at a low level contributes to the conversion rate in the Michael reaction. The compound is generally used in a proportion of not more than 100 mole % based on the amino function.

The Michael reaction in this invention may often be accelerated when use is made of a neutral or acid catalyst which is generally used in esterification.

Among esterification catalysts which can be used for this purpose include many of the common acids (hydrochloric acid, sulfuric acid, nitric acid, phosphoric acid, propionic acid, formic acid, acetic acid, dichloroacetic acid, trichloroacetic acid, trifluoroacetic acid, benzoic acid, p-toluenesulfonic acid, etc.) and, as solid acids, metal oxides (aluminum oxide, silicon oxide, niobium oxide, etc.), composite metal oxides ($SiO_2$-$Al_2O_3$, $TiO_2$-$SiO_2$, $SiO_2$-$La_2O_3$, $TiO_2$-$Al_2O_3$, etc.), sulfides (zinc sulfide etc.), metal sulfates (nickel sulfate, copper sulfate, etc.), metal phosphates (aluminum phosphate, titanium phosphate, etc.), chlorides (aluminum chloride, copper chloride, etc.), clay minerals (acid clay, montmorillonite, kaolin, etc.), immobilized acids (immobilized phosphoric acid, immobilized sulfuric acid, immobilized boric acid, etc.), resins (ion exchange resins, etc.), zeolite and so on. Furthermore, organometal compounds may also be employed. Thus, there may be mentioned organotin compounds (dibutyltin oxide, dibutyltin dilaurate, etc.), organoaluminum compounds including trialkoxides, chelates and acylates(aluminum isopropylate, mono-sec-butoxyaluminum diisopropylate, aluminum ethylate, aluminum ethylacetoacetate diisopropylate, aluminum-tris(ethyl acetoacetate), aluminum-tris(acetyl acetonate), aluminum-bis-ethylacetoacetate monoacetylacetonate, etc.), organotitanium compounds including tetralkoxides, chelates, acylates (tetraisoproxytitanium, tetra-n-butoxytitanium, tetrakis-2-ethylhexoxytitanium, tetrakis(stearyloxy)titanium, diisopropoxybis(acetylacetonato)titanium, isopropoxy(2-ethylhexanediolato)titanium, di-n-butoxy-bis(triethanolaminato)-titanium, hydroxy-bis(lactato)titanium, etc.) and so on. These compounds can also be used with advantage in the present invention.

The primary polyoxyalkylenepolyamine, aromatic polyamine and xylylenediamine may be independently subjected to Michael reaction and the respective reaction products be admixed. Alternatively, they may be admixed all in the primary amine form and subjected to Michael reaction concurrently or selectively. In either case, the primary polyamine is reacted with said unsaturated compound in an amino functionality/unsaturation ratio of 1:0.01 to 1:100, preferably 1:1 to 1:10. Therefore, the resulting modified polyamine may contain the unreacted primary polyamide and the excess of the unsaturated compound. The esterification catalyst is used generally in a proportion of not more than 0.1 mole % relative to the amino group.

The conditions of this reaction depend on the kind and amount of the esterification catalyst. Generally speaking, however, the reaction is generally conducted at a temperature between room temperature and about 150° C.

After completion of the reaction, the reaction mixture need not be after-treated. Where necessary, however, the residual unsaturated compound may be removed by distillation under reduced pressure, a suitable polymerization initiator may be added for polymerization, or the reaction mixture may be treated to remove the acid.

Polyisocyanates

A variety of polyisocyanates can be employed for the purposes of the invention. Among typical aromatic polyisocyanates are carbodiimide-type liquid diphehylmethane diisocyanate or diphenylmethane diisocyanate partial prepolymer, 2,4-tolylene diisocyanate, 2,6-tolylene diisocyanate, diphenylmethane-4,4'-diisocyanate, xylylene diisocyanate, crude toluylene diisocyanante, polymethylenepolyphenyl polyisocyanates, etc. and these polyisocyanates may be in the form of carbodiimides or biurets. A particularly preferred aromatic polyisocyanate is pure methylenebis(4-phenyl isocyanate) (hereinafter referred to MDI) or a prepolymer or modification product thereof.

These compounds can be used for the production of satisfactory RIM moldings. Pure MDI is a solid and, therefore, is often found to be inconvenient in use. Accordingly, liquid preparations based thereon are frequently used and such preparations are subsumed in the concept of MDI, that is methylenebis(4-phenyl isocyanate). U.S. Pat. No. 3,394,164 discloses examples of liquid MDI. Moreover, uretonimine-modified MDI is also included in the above definition. As commercial products of this type, Millionate MTL and Millionate MTL-C are available from Nippon Polyurethane Industry Co., Ltd.

The aliphatic or alicyclic polyisocyanate for use in this invention includes, inter alia, dicyclohexylmethane-4,4'-diisocyanate, isophorone diisocyanate, hexamethylene diisocyanate, hydrogenated xylylene diisocyanate, etc. and the corresponding isocyanurates and carbodiimides. The more beneficial aliphatic or alicyclic polyisocyanate is hydrogenated methylenebis(4-phenyl isocyanate) in the form of pure hexamethylene diisocyanate (HMDI) or an HMDI prepolymer. As commercial products of this type, there may be mentioned Coronate HX and Coronate HK from Nippon polyurethane Industry Co., Ltd. and Sumidur N3200 from SumitomoBayer Urethane Co., Ltd.

Polyurea Resin Composition

The invention provides a RIM composition for the manufacture of polyurea moldings, which features favorable moldability (particularly flow) and initial (green) strength characteristics.

To obtain such a RIM composition, it is preferable to insure that the ratio of the average amino equivalent of a mixture of polyamines (a) and (b) to the average NCO equivalent of a polyisocyanate component based on said polyisocyanate (c) (inclusive of a liquid polyisocyanate prepolymer) is 1:0.7 through 1:1.5, preferably 1:0.95 through 1:1.25 and, for still better results, 1:1.01 through 1:1.10 and that the secondary polyamine content of the polyamine components, the whole or part of which is a modified polyamine or modified polyamines, accounts for not less than 9.0 weight percent.

Compared with the conventional molding composition based on a primary polyoxyalkylenepolyamine and a primary aromatic polyamine, the molding composition of the invention is less reactive upon admixing of the resin forming component with the curing component so that the onset of the curing reaction is delayed, with the result that when the composition is charged into a mold cavity, it shows a flowability time of not less than 1.5 seconds. Therefore, compared with the conventional polyurea composition, the composition of the invention offers marked improvements in workability and moldability and provides a sufficient initial (green) strength.

Where necessary, in using the molding composition of the invention for reaction injection molding, there may be incorporated a variety of additives such as surfactants, blowing agents, foam stabilizers, flame retardants, plasticizers, fillers, fungicides, bactericides, reinforcing materials, internal mold releases, antioxidants, weatherability agents and so on in appropriate proportions.

Thus, the molding composition of the invention is possessed of and offers very satisfactory workability, moldability and initial (green) strength in RIM applications and, as such, is of great utility value in this field which is expected to witness ever larger and sophisticated products.

The following examples and comparative examples are intended to illustrate the present invention in further detail and should by no means be construed as defining the metes and bounds of the invention. In the examples, all parts and percents (%) are by weight.

PRODUCTION EXAMPLE 1

Texrim TR-5050 (trifunctional, amine equivalent 1930, average molecular weight 5000), 2-ethylhexyl acrylate and diaminodiphenylmethane were reacted in an equivalent ratio of 1:2:1 at 120° C. for 40 hours to give a modified polyamine A. Rate of conversion to secondary amino=86%.

PRODUCTION EXAMPLE 2

Jeffamine T-403 (trifunctional, amine equivalent 160, average molecular weight 400) and 2-ethylhexyl acrylate were reacted in a mole ratio of 1:1 for 5 hours to give a modified polyamine B. Rate of conversion to secondary amino=80%.

PRODUCTION EXAMPLE 3

Showamine X (bifunctional, amine equivalent 68, molecular weight 136) and 2-ethylhexyl acrylate were reacted in a mole ratio of 1:1 at 80° C. for 14 hours to give a modified polyamine C. Rate of conversion to secondary amino=87%.

EXAMPLE 1

Sixty-two (62) parts of modified polyamine A, 13 parts of modified polyamine B and 25 parts of diethyltoluenediamine were blended and the resulting mixture and 56 parts of Millionate MTL were injected, by the double jet method, in a mold for RIM under the following conditions.

| Mold | 400 mm × 300 mm × 3 mm (thick) |
|---|---|
| Temperature of charge | 55 ± 2° C. |
| Injection pressure | 150 ± 20 kg/cm² |
| Injecting rate | ca. 420 cc/sec |
| Mold temperature | 70 ± 2° C. |

After a retention time of 20 seconds, the molding was taken out and allowed to cure at 120° C. for 30 minutes to give a RIM product. This product was evaluated according to the criteria described below. The results are shown in Table 1.

TABLE 1

| | Example | | | | | | Comparative |
|---|---|---|---|---|---|---|---|
| | 1 | 2 | 3 | 4 | 5 | 6 | Example |
| (a) Component (parts) | | | | | | | |
| Texrim TR-5000 | — | — | 42 | — | 50 | 40 | 70 |
| Jeffamine D-2000 | — | — | — | 50 | — | — | — |
| Modified polyamine A | 62 | 42 | — | — | — | — | — |
| Modified polyamine B | 13 | 21 | 21 | 20 | — | 20 | — |
| (b) Component (parts) | | | | | | | |
| Etacure-100 | 25 | 37 | 37 | 30 | 30 | 30 | 30 |
| Modified polyamine C | — | — | — | — | — | 10 | — |
| Modified polyamine D | — | — | — | — | 20 | — | — |
| Secondary amine (%) in (a) + (b) | 63 | 53 | 17 | 16 | 17 | 26 | 0 |
| (c) Component (parts) | | | | | | | |
| Millionate MTL | 56 | 59 | 59 | 53 | 52 | 55 | 57 |
| Coronate HX | — | 24 | 24 | 22 | 21 | 23 | — |

EXAMPLES 2 THROUGH 6 AND COMPARATIVE EXAMPLE

Using the formulations shown in Table 1, RIM was carried out under the same conditions as in Example 1 and the resulting products were evaluated as in Example 1. The results are shown in Table 2.

TABLE 2

| | Example | | | | | | Comparative |
|---|---|---|---|---|---|---|---|
| Item | 1 | 2 | 3 | 4 | 5 | 6 | Example |
| Moldability | o | o | o | o | o | o | x |
| Initial strength | | | | | | | |
| Tensile strength (kg/cm²) | 280 | 260 | 260 | 240 | 220 | 260 | 140 |
| Elongation at break (%) | 20 | 41 | 39 | 38 | 28 | 45 | 10 |

Evaluation Criteria

TABLE 2-continued

| | Example | | | | | | Comparative |
|---|---|---|---|---|---|---|---|
| Item | 1 | 2 | 3 | 4 | 5 | 6 | Example |

1. Moldability
The mold filling performance of each composition was evaluated.
o: retained sufficient flowability for 1.5 seconds after the beginning of filling
x: lost flowability to interfere with mold filling within 1.5 seconds.
2. Initial (green) strength on removal from the mold The molding was removed from the mold 20 seconds after mold filling and immediately subjected to tensilometer test for measurement of tensile strength and elongation at break.

What is claimed is:

1. A reaction injection molding polyurea resin composition comprising
   (a) a polyoxyalkylenepolyamine,
   (b) an aromatic polyamine and/or a xylylenediamine, and
   (c) a polyisocyanate,
   said polyoxyalkylenepolyamine (a) or polyamine (b) is an at least partially secondary amino-terminated modified polyamine such that either the whole or part of (a) and/or (b) has been modified by a Michael reaction with an unsaturated compound of the formula $CH_2=C(R)-Y$ wherein R means a hydrogen atom or a methyl group and Y means an electron attracting group with the proviso that R cannot represent methyl when the polyamine is an aromatic polyamine.

2. A polyurea resin composition according to claim 1 wherein said modified polyamine accounts for not less than 9 weight percent of the total weight of said components (a), (b) and (c).

3. A polyurea resin composition according to claim 1 wherein the electron attracting group Y of said unsaturated compound $CH_2=C(R)-Y$ is a carboxylic ester residue, a ketone residue, a cyano group, an unsubstituted or substituted amide group, a sulfone residue, or a sulfonate residue.

4. A polyurea resin composition according to claim 1 wherein either the whole or part of said polyamine component (a) is said modified polyamine.

5. A polyurea resin composition according to claim 1 wherein either the whole or part of said polyamine component (b) is said modified polyamine.

6. A polyurea resin composition according to claim 1 wherein either the whole or part of both polyamine components (a) and (b) is said modified polyamine.

7. A polyurea resin composition according to claim 1 wherein the mole ratio of all amino groups in said polyamine components (a) and (b) to isocyanate groups in said polyisocyanate (c) is 1:0.7 through 1:1.5.

* * * * *